(12) United States Patent
Yamanaka (10) Patent No.: US 11,847,210 B2
(45) Date of Patent: Dec. 19, 2023

(54) DETECTING DEVICE AND DETECTING METHOD

(71) Applicant: NIPPON TELEGRAPH AND TELEPHONE CORPORATION, Tokyo (JP)

(72) Inventor: Yuki Yamanaka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 543 days.

(21) Appl. No.: 16/973,039

(22) PCT Filed: Jun. 20, 2019

(86) PCT No.: PCT/JP2019/024606
§ 371 (c)(1),
(2) Date: Dec. 8, 2020

(87) PCT Pub. No.: WO2019/245006
PCT Pub. Date: Dec. 26, 2019

(65) Prior Publication Data
US 2021/0271755 A1 Sep. 2, 2021

(30) Foreign Application Priority Data
Jun. 21, 2018 (JP) ................................. 2018-118143

(51) Int. Cl.
*G06F 21/55* (2013.01)
*G06N 20/00* (2019.01)

(52) U.S. Cl.
CPC .......... *G06F 21/554* (2013.01); *G06N 20/00* (2019.01); *G06F 2221/034* (2013.01)

(58) Field of Classification Search
CPC .. G06F 21/554; G06F 2221/034; G06N 20/00
See application file for complete search history.

(56) References Cited

U.S. PATENT DOCUMENTS

| 2004/0054505 A1* | 3/2004 | Lee | H04L 63/1466 |
| | | | 702/186 |
| 2019/0019109 A1* | 1/2019 | Sadaghiani | G06N 5/01 |

(Continued)

FOREIGN PATENT DOCUMENTS

| CN | 104200113 A | * 12/2014 |
| JP | 2013-214171 A | 10/2013 |
| JP | 2018-73258 A | 5/2018 |

OTHER PUBLICATIONS

Kingma et al., "Auto-Encoding Variational Bayes", May 1, 2014, pp. 1-14.

(Continued)

*Primary Examiner* — Ayoub Alata
(74) *Attorney, Agent, or Firm* — XSENSUS LLP (57) ABSTRACT

A detecting device (10) acquires information related to communication by an IoT device. The detecting device (10) inputs data representing a feature of the information related to the communication to a generative model which generates output data on the basis of a latent variable which is a random variable according to a mixed Gaussian distribution and input data, and calculates the output data. The detecting device (10) calculates an anomaly score on the basis of the output data and detects an anomaly in the IoT device when the anomaly score exceeds a threshold value.

5 Claims, 6 Drawing Sheets

(56) References Cited

U.S. PATENT DOCUMENTS

2019/0121350 A1* 4/2019 Cella .................. G06N 3/044
2019/0303567 A1* 10/2019 Batmaz ............... G06F 21/85

OTHER PUBLICATIONS

Tomczak et al., "VAE with a VampPrior", Feb. 26, 2018, 16 pages.
Koizumi et al. "Image Contents Retrieval based on Linguistic Meta-Data", Proceedings of the 11th Annual Meeting of the Association for Natural Language Processing, Mar. 15, 2005, pp. 737-740 (8 pages including English Translation).

* cited by examiner

DETECTING DEVICE AND DETECTING METHOD

CROSS-REFERENCE TO RELATED APPLICATIONS

The present application is based on PCT filing PCT/JP2019/024606, filed Jun. 20, 2019, which claims priority to JP 2018-118143, filed Jun. 21, 2018, the entire contents of each are incorporated herein by reference.

TECHNICAL FIELD

The present invention relates to a detecting device and a detecting method.

BACKGROUND ART

With the advent of the IoT age, various kinds of devices are connected to the Internet for use in various manners, and for security measures therefor, traffic session anomaly detection systems and intrusion detection systems (IDS) for IoT devices have been heavily researched.

Some of the anomaly detection systems use a probability density estimator based on unsupervised learning such as a VAE (Variational Auto Encoder). In anomaly detection by probability density estimation, the occurrence probability of a normal communication pattern is learned on the basis of a normal traffic and communication with a low occurrence probability is detected as an anomaly.

Therefore, the VAE can detect an anomaly when all malignant conditions are not available. This characteristic is well suited for detection of cyberattacks against IoT devices which are still in transition and cannot be fully familiar with all threat intelligence.

CITATION LIST

Non Patent Literature

[NPL 1] Diederik P. Kingma, Max Welling, "Auto-Encoding Variational Bayes" [online], [retrieved Jun. 11, 2018], retrieved from the Internet: <URL: https://arxiv.org/pdf/1312.6114.pdf>

SUMMARY OF THE INVENTION

Technical Problem

However, using the conventional VAE, the accuracy of anomaly detection in an IoT device may be reduced in some cases. Specifically, when the conventional VAE is used, the accuracy of probability density estimation may be reduced due to so-called "too strong regularization" problem, and the accuracy of anomaly detection may be reduced as a result.

Here, a conventional VAE will be described. The conventional VAE is adapted to encode input data once into a low dimensional Gaussian distribution and decode the data to approximate the input data using only a smaller amount of information after encoding. In this way, an encoder which extracts only the information necessary for correctly reconstructing the input data can be acquired.

In this case, the conventional VAE may be constrained too strongly by the "encoding into a low-dimensional Gaussian distribution," and even the information necessary for reconstruction can be reduced. This is the problem about the "too strong regularization."

Effects of the Invention

According to the present invention, the reduction in the accuracy of detecting an anomaly in an IoT device can be restrained.

DESCRIPTION OF EMBODIMENTS

Hereinafter, a detecting device and a detecting method according to an embodiment of the present invention will be described in detail in conjunction with the accompanying drawings. Note that the present invention is not limited by the following embodiment.

Configuration of First Embodiment

Figure 1:
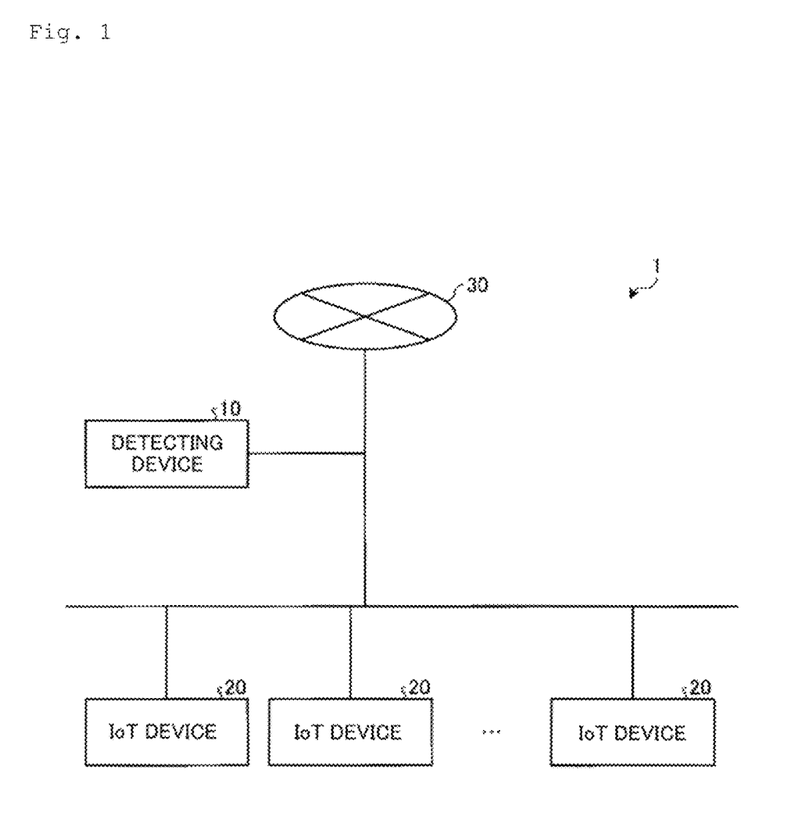
FIG. 1 is a diagram of an exemplary configuration of a detecting system according to a first embodiment of the invention.

Referring to FIG. 1, the configuration of a detecting system according to the first embodiment will be described. FIG. 1 is a diagram of an exemplary configuration of the detecting system according to the first embodiment. As shown in FIG. 1, the detecting system 1 has a detecting device 10 and an IoT device 20.

The detecting device 10 acquires information related to communication between the IoT device 20 and an external network 30. For example, the detecting device 10 acquires such information from a gateway provided between the IoT device 20 and the external network 30. For example, the detecting device 10 may acquire traffic session information. The detecting device 10 also detects an anomaly in the IoT device 20 using a generative model having learned using the acquired information. The IoT device 20 may be a device such as a monitoring camera and a wearable device provided with a communication function.

Figure 2:
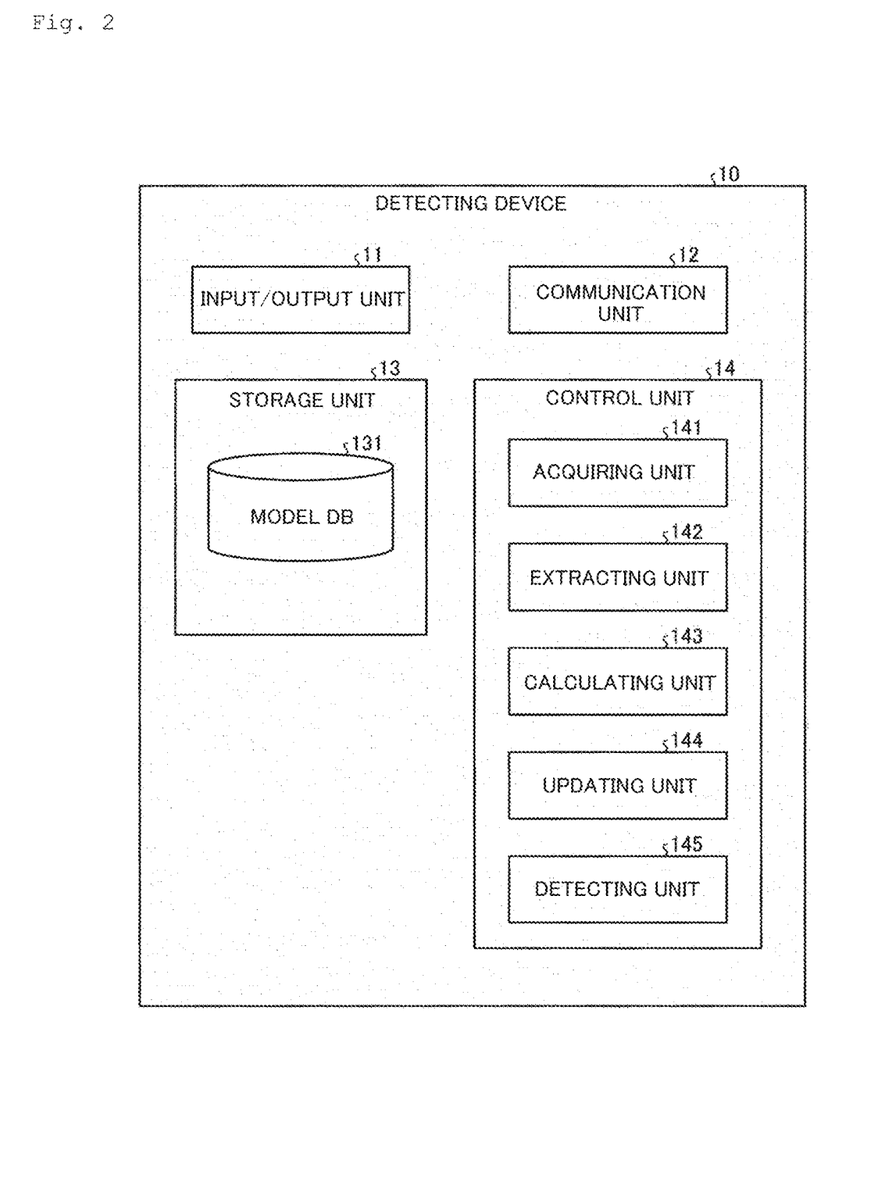
FIG. 2 is a diagram of an exemplary configuration of a detecting device according to the first embodiment.

Now, referring to FIG. 2, the configuration of the detecting device 10 will be described. FIG. 2 is a diagram of an exemplary configuration of the detecting device according to the first embodiment. As shown in FIG. 2, the detecting device 10 includes an input/output unit 11, a communication unit 12, a storage unit 13, and a control unit 14.

Figure 3:
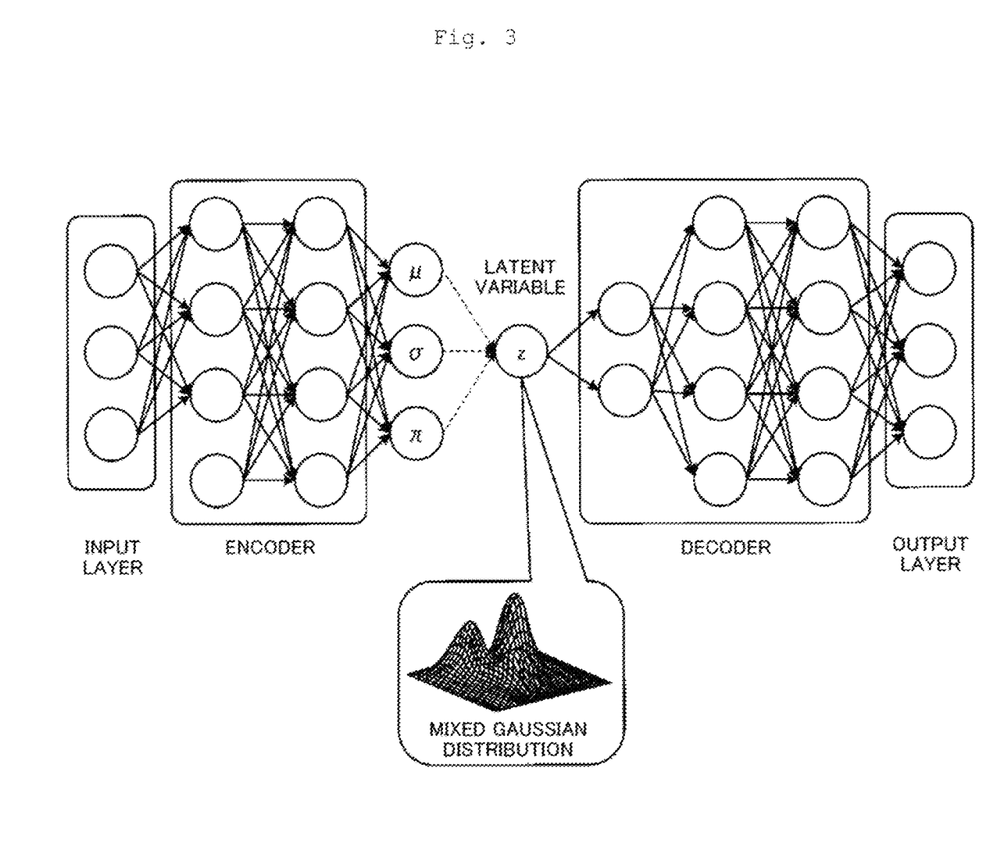
FIG. 3 is a diagram for illustrating a generative model according to the first embodiment.

Here, the detecting device 10 performs detecting and learning using a VAE-based generative model. The generative model used according to the embodiment will be described with reference to FIG. 3. FIG. 3 is a diagram for illustrating the generative model according to the first embodiment.

As shown in FIG. 3, the generative model according to the embodiment uses an auto-encoder similarly to the conventional VAE. The generative model includes an input layer, an encoder, a decoder, and an output layer. The generative model encodes data input to the input layer, generates a latent variable which is a random variable on the basis of the encoded data, decodes a probabilistically determined value from the latent variable, and outputs the decoded data as output data to the output layer.

The latent variable in the conventional VAE is represented by a single-peak Gaussian distribution. In contrast, the latent variable in the generative model according to the embodiment is represented by a multi-peak Gaussian distribution, in other words, by a mixed Gaussian distribution.

Here, when the encoder is q(z|x), the latent variable is p(z), and the decoder is p(x|z), an objective function for optimizing the generative model according to the embodiment is expressed by the following expression (1).

[Formula 1]

$$L(x) = E_{q(z|x)}[p(x|z)] - D_{KL}(q(z|x) \| p(z)) \quad (1)$$

In the expression, q(z|x) is a mixed Gaussian distribution and is expressed by the following expression (2).

[Formula 2]

$$q(z|x) = \Sigma_i \pi_i N(\mu_i, \sigma_i) \quad (2)$$

$\pi_i$ is a weight set for the Gaussian distribution $N(\mu_i, \sigma_i)$ with a mean $\mu_i$ and a variance $\sigma_i$. $\pi_i$, $\mu_i$, and $\sigma_i$ are parameters which are updated by the learning by the generator model. The sum of $\pi_i$ may always be set constant. For example, when q(z|x) is a mixed Gaussian distribution including three Gaussian distributions, $\pi_1 + \pi_2 + \pi_3 = 1$ may be set as a constraint condition.

Furthermore, when q(z|x) is a mixed Gaussian distribution, the detecting device 10 calculates the Kullback-Leibler divergence (expression (3)) of the objective function in expression (1) using an approach described in reference document 1 ("Lower and Upper Bounds for Approximation of the Kullback-Leibler Divergence Between Gaussian Mixture Models" by Durrien, Thiran, and Kelly (2012)) or reference document 2 ("Approximating the Kullback Leibler divergence between Gaussian Mixture Models" by Hershey and Olsen (2007)).

[Formula 3]

$$-D_{KL}(q(z|x) \| p(z)) \quad (3)$$

As an example, the detecting device 10 decomposes the Kullback-Leibler divergence as in the following expression (4) and calculates a lower or upper bound for each of the first and second terms in expression (4) using Jensen's inequality. The detecting device 10 then calculates the Kullback-Leibler divergence in expression (2) approximatively by combining the calculated lower or upper bound.

[Formula 4]

$$E_{x \sim q(z|x)}[\log q(z|x)] - E_{x \sim q(z|x)}[\log p(z)] \quad (4)$$

In this way, since the detecting device 10 calculates output data using a latent variable according to a mixed Gaussian distribution, the latent variable can have more information than when a single Gaussian distribution is used. Therefore, according to the embodiment, the degree of regularization by the detecting device 10 can be lowered as compared to the conventional VAE, and the reduction in the detection accuracy can be reduced.

Referring back to FIG. 2, the input/output unit 11 receives data input from a user. The input/output unit 11 may include an input device such as a mouse device and a keyboard, and a display device such as a display and a touch panel. The communication unit 12 may perform data communication with other devices through a network. For example, the communication unit 12 is a Network Interface Card (NIC). For example, the communication unit 12 may perform data communication with the IoT device 20, the gateway that is placed between the IoT device 20 and the external network 30, etc.

The storage unit 13 is a storage device such as an HDD (Hard Disk Drive), an SSD (Solid-State Drive), and an optical disk. The storage unit 13 may be a data-rewritable semiconductor memory such as a RAM (Random Access Memory), a flash memory, and an NVSRAM (Non-Volatile Static Random Access Memory). The storage unit 13 stores an OS (Operating System) or various programs executed by the detecting device 10. The storage unit 13 also stores various kinds of information used in executing the programs. The storage unit 13 also includes a model database (DB) 131. The model DB 131 stores for example parameters of generative models which have learned.

The control unit 14 controls the entire detecting device 10. The control unit 14 is for example an electronic circuit such as a CPU (Central Processing Unit), GPU (Graphics Processing Unit), TPU (Tensor Processing Unit) and an MPU (Micro Processing Unit), or an integrated circuit such as an ASIC (Application Specific Integrated Circuit) and an FPGA (Field Programmable Gate Array). The control unit 14 has an internal memory for storing programs which specify various procedures or control data and performs various kinds of processing using the internal memory. The control unit 14 also functions as various processing units as various programs operate. For example, the control unit 14 includes an acquiring unit 141, an extracting unit 142, a calculating unit 143, an updating unit 144, and a detecting unit 145.

The acquiring unit 141 acquires information related to communication by the device. For example, the acquiring unit 141 acquires traffic session information from a log related to communication by the IoT device. For example, the acquiring unit 141 acquires the amount of data in the IoT device 20 and the number and size of packets transmitted/received by the device as the traffic session information. The acquiring unit 141 acquires for example the MAC address, the IP address, the port number, and the communication protocol of each of the IoT device 20 and the communication destination.

The extracting unit 142 extracts a predetermined feature value from the communication-related-information acquired by the acquiring unit 141. For example, the extracting unit 142 generates a feature vector including, as an element, a normalized value representing quantitative information such as the amount of data or the number of packets included in the information acquired by the acquiring unit 141 or a numerical value representing qualitative information such as various addresses and protocols included in the information.

The calculating unit 143 inputs data representing features of the communication-related-information to the generative model which generates output data on the basis of a latent variable which is a random variable according to the mixed Gaussian distribution and calculates the output data. The calculating unit 143 inputs the data extracted by the extracting unit 142 to the input layer of the generative model as shown in FIG. 3 and executes calculation for generating the output data.

The updating unit 144 updates the parameters of the generative model so that the difference between the output data and the feature value input to the generative model is reduced. Specifically, the updating unit 144 updates the parameters so that the objective function in expression (1) is optimized. At the time, the updating unit 144 updates the mean, variance, and weight of each of the Gaussian distributions weighted and included in the mixed Gaussian distribution. In this way, the updating unit 144 has the generative model learn the features of communication in the normal state.

The detecting unit 145 detects an anomaly in the device using an anomaly score calculated on the basis of the output data. The detecting unit 145 calculates, by the calculating unit 143, an anomaly score which increases as the difference between a feature value input to the generative model and output data output from the generative model increases and decreases as the difference decreases. In other words, the anomaly score is a score indicating the degree of deviation of the state of communication by a detection target from the feature of communication in the normal state. When the anomaly score exceeds a threshold value, the detecting unit 145 detects the occurrence of an anomaly.

Processing According to First Embodiment

Figure 4:
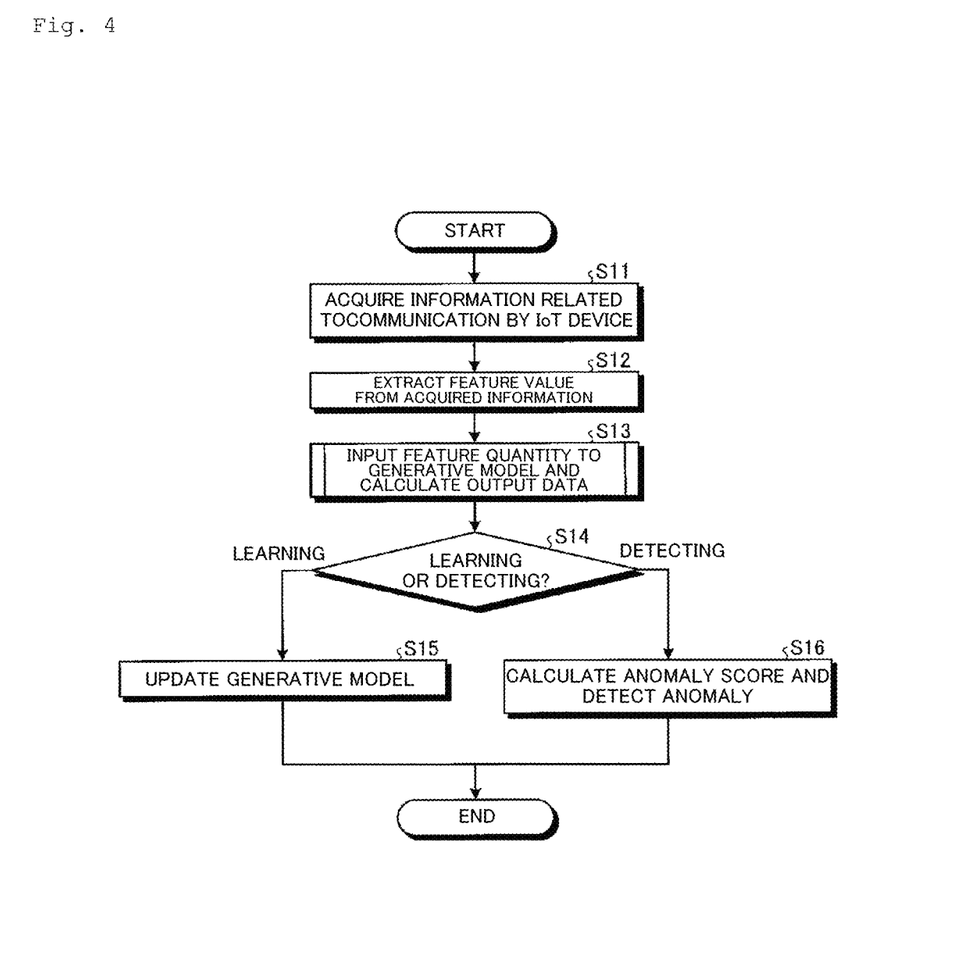
FIG. 4 is a flowchart for illustrating the flow of processing by the detecting device according to the first embodiment.
Figure 5:
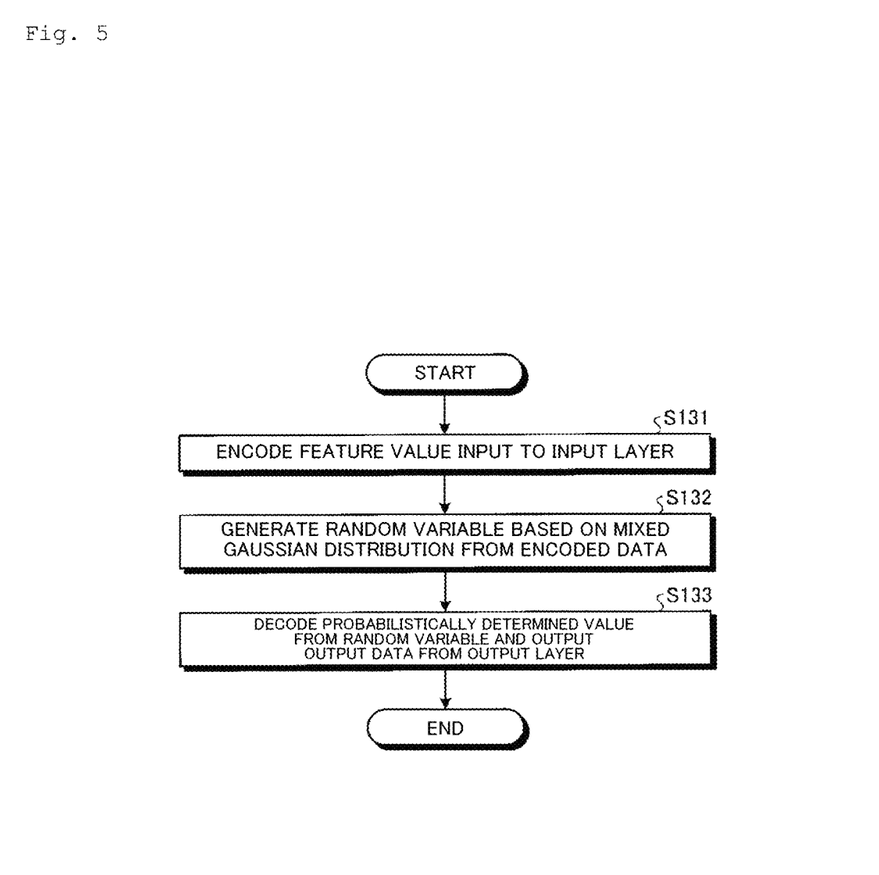
FIG. 5 is a flowchart for illustrating the flow of processing by the detecting device according to the first embodiment.

The processing by the detecting device 10 will be described with reference to FIGS. 4 and 5. FIGS. 4 and 5 are flowcharts for illustrating the flow of the processing by the detecting device according to the first embodiment. As shown in FIG. 4, the detecting device 10 first acquires information related to communication by the IoT device 20 (step S11).

Next, the detecting device 10 extracts a feature value from the acquired information (step S12). The detecting device 10 inputs the extracted feature value to the generative model and calculates output data (step S13). The processing for calculating the output data will be described later with reference to FIG. 5.

The detecting device 10 performs processing from step S11 to step S13 both for executing learning by the generative model and for detecting an anomaly. Here, when the detecting device 10 has the generative model learn (step S14, learning), the detecting device 10 updates the generative model on the basis of the calculated output data (step S15). Meanwhile, when the detecting device 10 performs anomaly detection (step S14, detecting), the detecting device 10 calculates an anomaly score on the basis of the calculated output data and detects an anomaly (step S16).

The processing for calculating the output data will be described with reference to FIG. 5. As shown in FIG. 5, the detecting device 10 encodes a feature value input to the input layer (step S131). The detecting device 10 then generates a random variable based on a mixed Gaussian distribution from the encoded data (step S132). The detecting device 10 outputs the data acquired by decoding a value probabilistically determined from the random variable as output data from the output layer (step S133).

Effects of First Embodiment

According to the first embodiment, the detecting device 10 acquires information related to communication by the device. The detecting device 10 inputs data representing a feature of the information related to the communication to the generative model which generates output data on the basis of a latent variable which is a random variable according to a mixed Gaussian distribution and the input data, and calculates the output data. The detecting device 10 uses an anomaly score calculated on the basis of the output data to detect an anomaly in the device.

In this way, according to the first embodiment, the distribution followed by the latent variable is the mixed Gaussian distribution. In this way, according to the first embodiment, the latent variable can have more information than when the latent variable follows a single Gaussian distribution, so that the reduction in the accuracy of probability density estimation can be reduced. Therefore, according to the first embodiment, the reduction in the accuracy of detecting an anomaly in the IoT device can be reduced.

Here, an experiment in which the anomaly detection accuracy was compared between a method using a conventional VAE and a method according to the embodiment will be described. First, in the experiment, Letter <URL: http://odds.cs.stonybrook.edu/letter-recognition-dataset/> was used as a data set for anomaly detection. The number of epochs in the learning was 1000. In addition, the number of element distributions mixed in a mixed Gaussian distribution in the generative model according to the embodiment was set to 3. Learning and detecting were performed ten times using each of the methods, and evaluation was performed on the basis of the mean of the AUC (Area Under the Curve) values.

As the result of the experiment, the mean AUC value for the method with the conventional VAE was $0.942\pm0.0198$. In contrast, the mean AUC value by the method according to the embodiment was $0.97976\pm0.0103$. Therefore, it can be understood that the method according to the embodiment significantly improves the anomaly detection accuracy as compared to the method using the conventional VAE.

The updating unit 144 updates the parameters of the generative model so that the difference between the output data and the feature value input to the generative model is reduced. In this way, according to the first embodiment, the updating unit 144 can have the generative model learn while assuming that the input data represents the feature of communication in the normal state.

The updating unit 144 updates the mean, variance, and weight of each of the Gaussian distributions weighted and included in the mixed Gaussian distribution. In this way, according to the first embodiment, by updating the weight of the mixed Gaussian distribution, which peak to be removed among the peaks of the distributions included in the mixed Gaussian distribution is selected, so that the distribution shape can be optimized.

[Program]

According to one embodiment, the detecting device 10 may be implemented by installing, on a desired computer, a detecting program for performing the above-described detection as package software or on-line software. For example, as the detecting program is executed by the information processing device, an information processing device functions as the detecting device 10. The information processing device herein may include a desktop type or notebook type personal computer. Examples of other information processing devices include a mobile communication terminal such as a smartphone, a mobile phone, and a PHS (Personal Handy-phone System), and a slate terminal such as a PDA (Personal Digital Assistant).

The detecting device 10 may also be implemented as a detecting server device which provides services related to detection described above to a terminal device used by the user as a client. For example, the detection server device may be implemented as a server device which provides a detection service in which information related to communication of IoT devices are an input and a detection result is an output. In this case, the detection server device may be implemented as a web server or may be implemented as a cloud which provides the above detection service by outsourcing.

Figure 6:
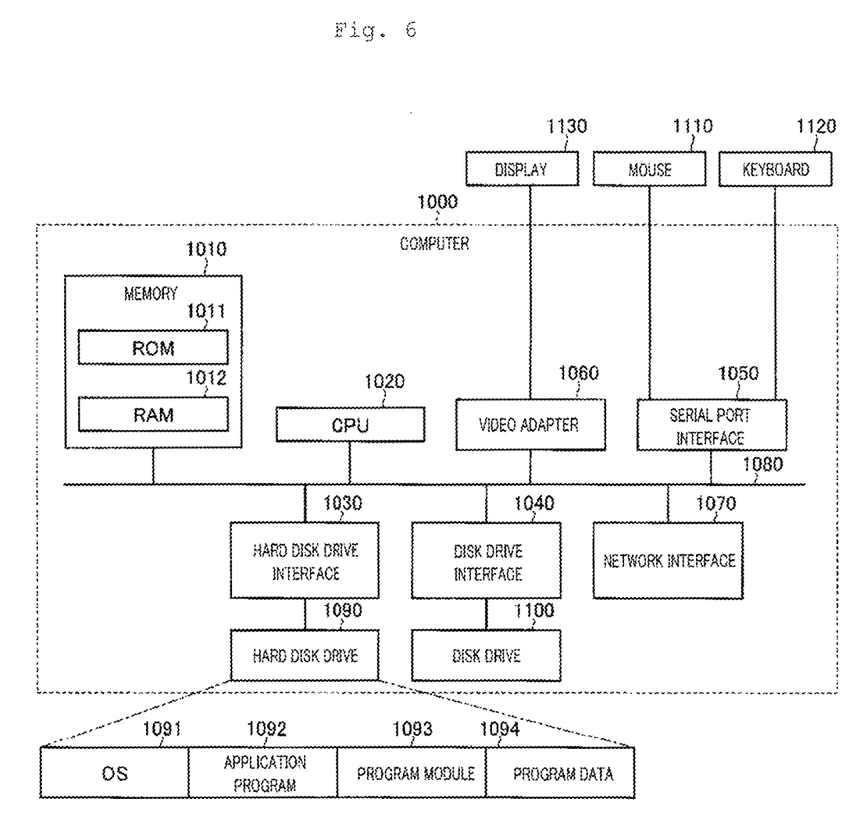
FIG. 6 is a diagram of an exemplary computer which executes a detecting program.

FIG. 6 is a diagram for illustrating an exemplary computer which executes a detection program. For example, the computer 1000 includes a memory 1010 and a CPU 1020. The computer 1000 also includes a hard disk drive interface 1030, a disk drive interface 1040, a serial port interface 1050, a video adapter 1060, and a network interface 1070. These components are connected by a bus 1080.

The memory 1010 includes a ROM (Read Only Memory) 1011 and a RAM 1012. The ROM 1011 stores a boot program such as a BIOS (Basic Input Output System). The hard disk drive interface 1030 is connected to a hard disk drive 1090. The disk drive interface 1040 is connected to a disk drive 1100. A removable storage medium such as a magnetic disk and an optical disk is inserted into the disk drive 1100. The serial port interface 1050 is for example connected to a mouse device 1110 and a keyboard 1120. The video adapter 1060 is for example connected to a display 1130.

The hard disk drive 1090 stores for example an OS 1091, an application program 1092, a program module 1093, and program data 1094. More specifically, the program defining each kind of processing by the detecting device 10 is implemented as the program module 1093 in which a code executable by the computer is described. The program module 1093 is stored for example in the hard disk drive 1090. For example, the program module 1093 for executing processing identical to the functional configuration of the detecting device 10 is stored in the hard disk drive 1090. The hard disk drive 1090 may be replaced by an SSD.

Then, the setting data used in the processing according to the above-described embodiment is stored as the program data 1094 for example in the memory 1010 or the hard disk drive 1090. The CPU 1020 then reads out the program module 1093 or the program data 1094 stored in the memory 1010 or the hard disk drive 1090 into the RAM 1012 for execution as needed.

Note that the program module 1093 and the program data 1094 may be stored in a removable storage medium and read out by the CPU 1020 for example through the disk drive 1100 rather than being stored in the hard disk drive 1090. Alternatively, the program module 1093 and the program data 1094 may be stored in another computer connected over a network (such as LAN (Local Area Network) and WAN (Wide Area Network)). The program module 1093 and the program data 1094 may then be read out from the computer by the CPU 1020 through the network interface 1070.

REFERENCE SIGNS LIST

10 Detecting device
11 Input/output unit
12 Communication unit
13 Storage unit
14 Control unit
20 IoT device
30 External network
141 Acquiring unit
142 Extracting unit
143 Calculating unit
144 Updating unit
145 Detecting unit

The invention claimed is:

1. A detecting device, comprising:
    acquiring circuitry which acquires information related to communication by an Internet of Things ("IoT") device;
    calculating circuitry which inputs data representing a feature of the information related to the communication to a generative model which generates output data using a latent variable which is a random variable according to a mixed Gaussian distribution and input data, and calculates the output data;
    detecting circuitry which detects an anomaly in the IoT device using an anomaly score calculated using the output data; and
    updating circuitry configured to update a parameter of the generative model such that a difference between the output data and a feature value input to the generative model is reduced.

2. The detecting device according to claim 1, wherein:
    the updating circuitry is further configured to update a mean, variance, and weight of each of Gaussian distributions weighted and included in the mixed Gaussian distribution.

3. A detecting method executed by a computer, the method comprising:
    acquiring information related to communication by an Internet of Things ("IoT") device;
    inputting input data representing a feature of the information related to the communication to a generative model which generates output data using a latent variable which is a random variable according to a mixed Gaussian distribution and calculating the output data; and
    detecting an anomaly in the device using an anomaly score calculated using the output data; and
    updating a parameter of the generative model such that a difference between the output data and a feature value input to the generative model is reduced.

4. The detecting method of claim 3, wherein:
    the updating further includes updating a mean, variance, and weight of each of Gaussian distributions weighted and included in the mixed Gaussian distribution.

5. A non-transitory computer readable medium storing computer instructions which when executed cause a computer to perform the method of claim 3.

* * * * *